United States Patent
Zhao et al.

(10) Patent No.: US 9,836,660 B2
(45) Date of Patent: Dec. 5, 2017

(54) VISION-BASED WET ROAD SURFACE CONDITION DETECTION USING TIRE TRACKS

(71) Applicant: GM GLOBAL TECHNOLOGY OPERATIONS LLC, Detroit, MI (US)

(72) Inventors: Qingrong Zhao, Madison Heights, MI (US); Qi Zhang, Sterling Heights, MI (US); Jinsong Wang, Troy, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 14/957,983

(22) Filed: Dec. 3, 2015

(65) Prior Publication Data

US 2017/0161572 A1    Jun. 8, 2017

(51) Int. Cl.
*G06K 9/00* (2006.01)
*B60W 40/06* (2012.01)
*G06K 9/32* (2006.01)
*G06K 9/46* (2006.01)
*G06T 7/00* (2017.01)
*H04N 7/18* (2006.01)

(52) U.S. Cl.
CPC ......... *G06K 9/00798* (2013.01); *B60W 40/06* (2013.01); *G06K 9/3233* (2013.01); *G06K 9/4604* (2013.01); *G06T 7/0085* (2013.01); *H04N 7/183* (2013.01); *B60W 2420/42* (2013.01); *B60W 2550/14* (2013.01); *B60W 2710/06* (2013.01); *B60W 2710/18* (2013.01); *B60W 2720/40* (2013.01); *B60W 2750/40* (2013.01); *G06T 2207/20024* (2013.01); *G06T 2207/30256* (2013.01)

(58) Field of Classification Search
CPC ............. G06K 9/00798; G06K 9/3233; G06K 9/4604; B60W 40/06; B60W 2420/42; B60W 2550/14; B60W 2710/06; B60W 2710/18; B60W 2720/40; B60W 2750/40; G06T 7/0085; G06T 2207/20024; G06T 2207/30256; H04N 7/184
See application file for complete search history.

(56) References Cited

U.S. PATENT DOCUMENTS

| | | | | |
|---|---|---|---|---|
| 5,080,397 A | * | 1/1992 | Metcalf | B62D 25/168 280/848 |
| 8,175,785 B2 | * | 5/2012 | Turski | B60T 8/175 180/197 |
| 2010/0161194 A1 | * | 6/2010 | Turski | B60T 8/175 701/87 |

* cited by examiner

*Primary Examiner* — Richard Camby
(74) *Attorney, Agent, or Firm* — Quinn IP Law

(57) ABSTRACT

A method of determining a wet surface condition of a road. An image of a road surface is captured by an image capture device of the host vehicle. The image capture device is mounted on a side of the host vehicle and an image is captured in a downward direction. A region of interest is identified in the captured image by a processor. The region of interest is in a region rearward of a tire of a host vehicle. The region of interest is representative of where a tire track as generated by the tire rotating on the road when the road surface is wet. A determination is made whether water is present in the region of interest as a function of identifying the tire track. A wet road surface signal is generated in response to the identification of water in the region of interest.

27 Claims, 6 Drawing Sheets

VISION-BASED WET ROAD SURFACE CONDITION DETECTION USING TIRE TRACKS

BACKGROUND OF INVENTION

An embodiment relates generally to detection of a wet road surface using detection of tire tracks.

Precipitation on a driving surface causes several different issues for a vehicle. For example, water on a road reduces the coefficient of friction between the tires of the vehicle and the surface of the road resulting in vehicle stability issues. Detection of precipitation on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

SUMMARY OF INVENTION

An advantage of an embodiment is the detection of water on a road using a vision-based imaging device that identifies precipitation based on the tire tracks of the vehicle traveling over a wet road surface. The technique described herein requires no excitations from the vehicle or driver for initiating a determination of whether precipitation is present. Rather, precipitation is determined in response to monitoring tire tracks immediately formed on the road by tire displacing water to the sides as tire rotates over the surface of the road. The technique preferably captures an image that includes tire tracks left in the water on the road surface as the vehicle tire rotates along the road surface. The technique utilizes a polarized image of the captured scene and applies edge filtering to identify a line edge. The polarized image is oriented to identify a vertical edge in the image generated by the tire track. The filter generates a large peak along an edge in a filter response graph. If a track exists, a filter response would have a large peak in contrast to a relatively flat response if no track existed. A classifier is trained using training data with a separation threshold identified and then the trained classifier is implemented in vehicle for online detection of water on the road based on the active monitoring of the road surface.

An embodiment contemplates a method of determining a wet surface condition of a road. An image of a road surface is captured by an image capture device of the host vehicle. The image capture device is mounted on a side of the host vehicle and captures an image in a downward direction. A region of interest is identified in the captured image by a processor. The region of interest is in a region rearward of a tire of a host vehicle. The region of interest is representative of where a tire track as generated by the tire occurs when the road surface is wet. A determination is made whether water is present in the region of interest as determined as a function of identifying the tire track generated by the tire. A wet road surface signal is generated in response to the identification of water in the region of interest.

DETAILED DESCRIPTION

Figure 1:
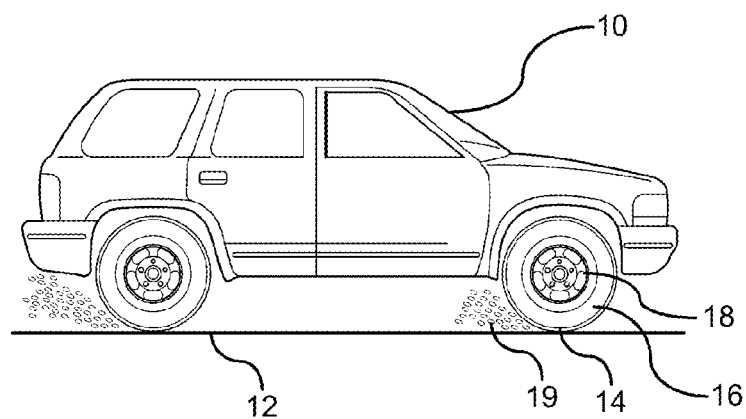
FIG. 1 an exemplary perspective view of a vehicle scene on a wet surface captured by a camera.

There is shown in FIG. 1, a vehicle 10 traveling along a vehicle road 12. Precipitation 19, in the form of water, shown disposed on the vehicle road 12 is often displaced by the vehicle wheel 14 and tires 16 mounted on a rim 18 of the wheel 14 as the tires rotate over the wet surface on the vehicle road 12. It is often advantageous to know when the vehicle will be traveling along a wet vehicle road 12 so that issues resulting from water, such as loss of traction or engine degradation resulting from water entering exterior air intake vents can be negated or at least mitigated.

Precipitation 19 on the vehicle road 12 can result in a reduction of traction when driving on the wet road surface. The precipitation 19 disposed on the vehicle road 12 lowers the coefficient of friction between the vehicle tires and the vehicle road 12. As a result, traction between the vehicle tires and the vehicle road 12 is lowered. Loss of traction can be mitigated by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle. It should be understood that the embodiments described herein can be applied to other types of systems aside from automobiles where detection of a wet road surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Figure 3:
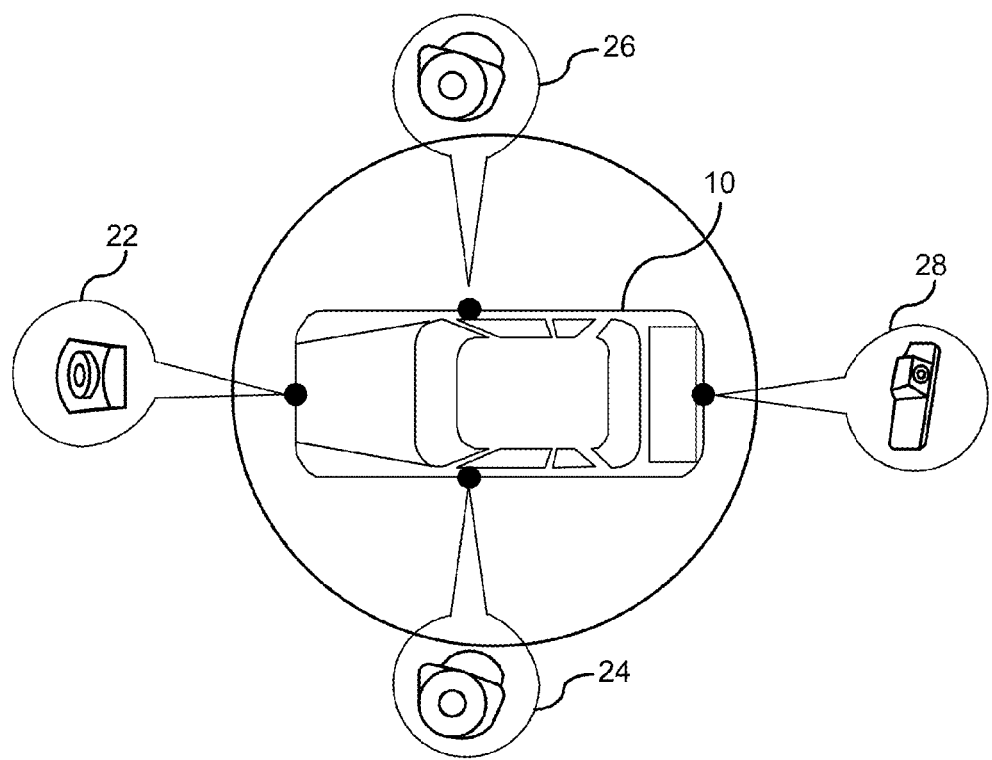
FIG. 3 is an exemplary perspective view of a vehicle surround having surround view coverage.
Figure 2:
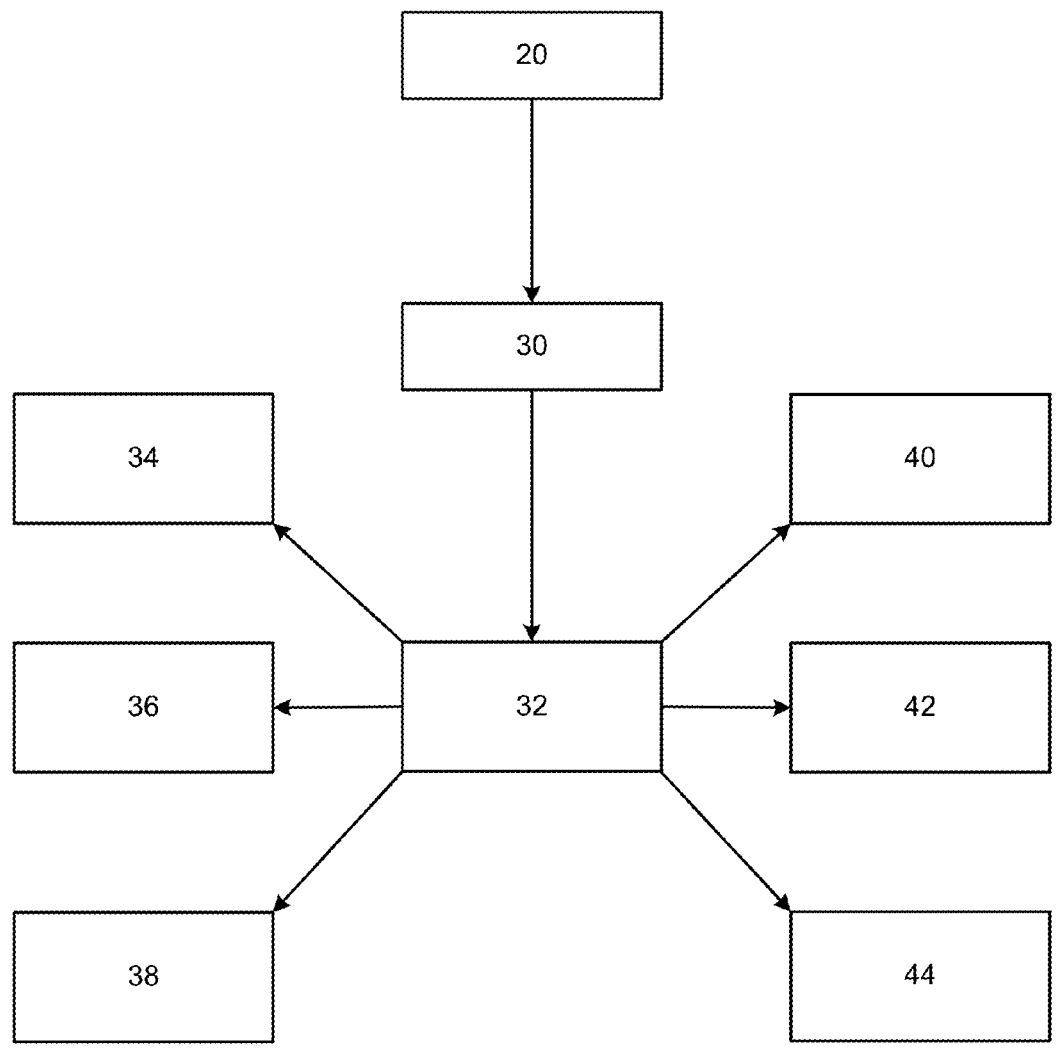
FIG. 2 illustrates a block diagram of a wet road surface detection system.

FIG. 2 illustrates a block diagram of a wet road surface detection system. A plurality of vehicle-based image capture devices 20 are mounted on the vehicle for capturing images around the vehicle. The plurality of vehicle based image capture devices 20 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 is mounted to a front of the vehicle capturing image forward and partially to the sides of the vehicle. A driver's side camera 24 captures images on the driver side of the vehicle. A passenger's side camera 26 captures images on the passenger side of the vehicle. A rearward facing camera 28 captures images rearward and to the side of the vehicle.

Referring again to FIG. 2, a processor 30 processes the images captured by the image capture devices 20. The processor 30 analyzes images and data to determine whether water is present on the road surface based on tire tracks immediately left on the wet road surface as the vehicle tires rotate along the road. Once the processor 30 identifies the wheel of the vehicle 10, the processor 30 identifies a region of interest and analyzes the region immediately rearward of the wheel where tire tracks would be likely to occur if water is present on the road. The processor 30 may be part of an existing system, such as traction control system or other system, or can be a standalone processor dedicated to analyzing data from the image capture devices 22.

The processor 30 may be coupled to one or more output devices such as a controller 32 for initiating or actuating a control action if water is found in the region of interest. One or more countermeasures may be actuated for mitigating the effect that the water may have on the operation of the vehicle.

The controller 32 may be part of the vehicle subsystem or may be used to enable a vehicle subsystem for countering the effects of the water. For example, in response to a determination that the road is wet, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove water from the vehicle brakes once the vehicle enters the water. Removal of water build-up from the wheels and brakes maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when water is detected on the road surface.

The controller 32 may control a cruise control system 38 which can deactivate cruise control or restrict the activation of cruise control when water is detected on the road surface.

The controller 32 may control a driver information system 40 for providing warnings to the driver of the vehicle concerning water that is detected on the vehicle road. Such a warning actuated by the controller 32 may alert the driver to the approaching water on the road surface and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing water ingestion into an engine of the vehicle. Under such conditions, the controller 32 automatically actuates the closing of the air baffles 42 when water is detected to be present on the road surface in front of the vehicle and may re-open the air baffles when water is determined to no longer be present on the road surface.

The controller 32 may further control the actuation of a wireless communication device 44 for autonomously communicating the wet pavement condition to other vehicles utilizing a vehicle-to-vehicle or vehicle-to-infrastructure communication system.

The controller may further provide the wet road surface signal alerts to a driver of the vehicle against a use of automated features that include, but are not limited to, Adaptive Cruise Control, Lane Following, Lane Change, Evasive/Assist Steering Maneuver, Automated Emergency Braking, etc.

The advantage of the techniques described herein is that no excitations are required from the vehicle or driver for initiating a determination of whether water is present. That is, prior techniques require some considerable excitation by the vehicle whether by way of a braking maneuver, increased acceleration, steering maneuver so as for surface water detection. Based on the response (e.g., wheel slip, yawing), such a technique determines whether the vehicle is currently driving on water. In contrast, the techniques described herein do not require driver excitations for determining water on the road.

Figure 4:
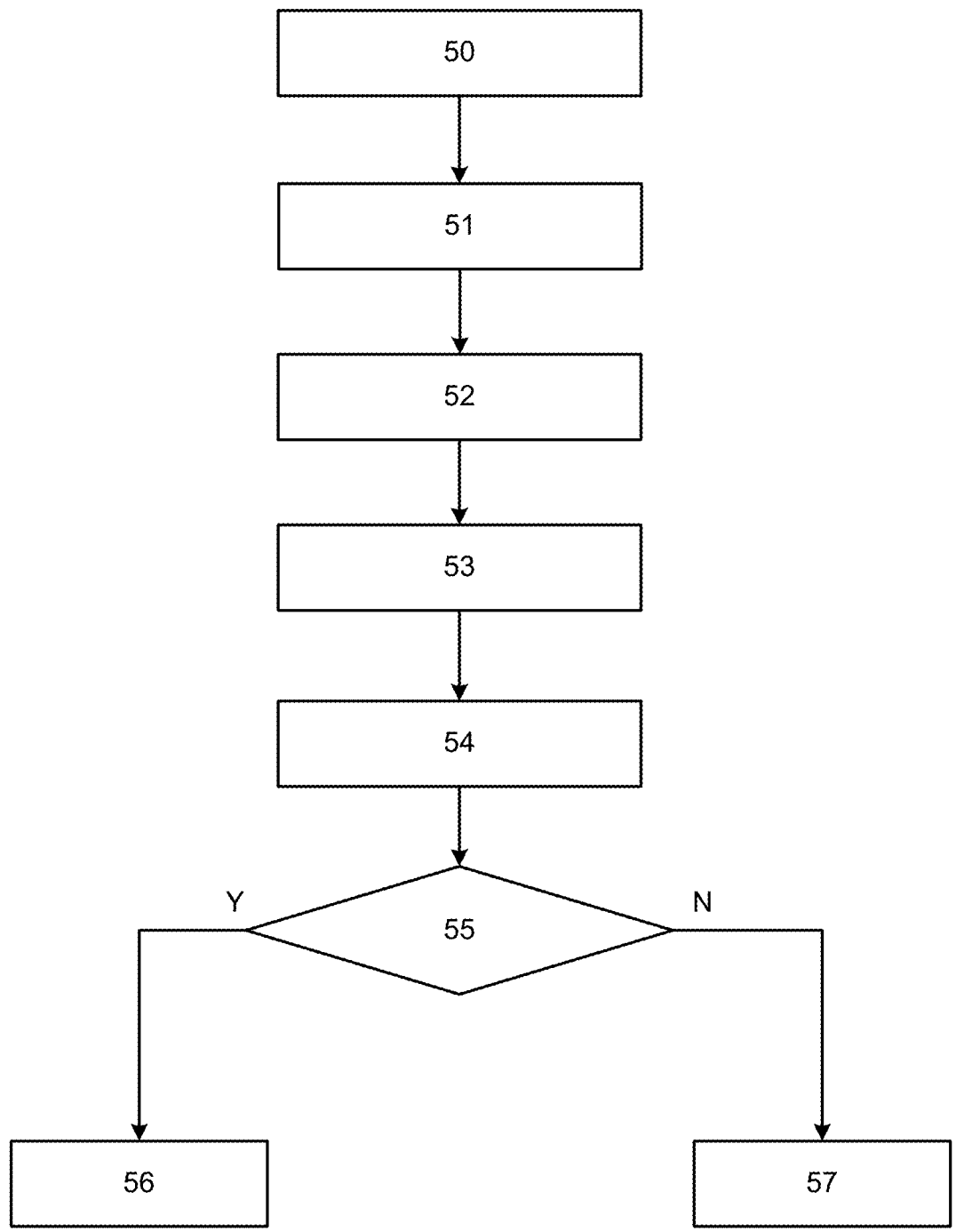
FIG. 4 illustrates a flowchart of a method for detecting a wet surface.
Figure 5:
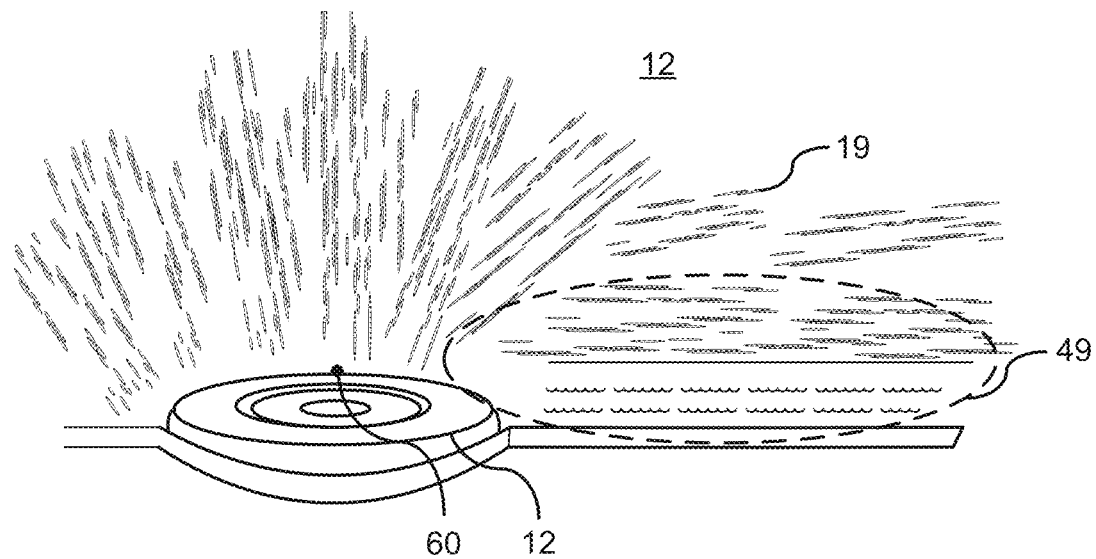
FIG. 5 illustrates an image captured by the image capture device.

FIG. 4 illustrates a flowchart of a method for detecting a wet surface of the road. In step 50, an image is obtained of region juxtaposed to a vehicle wheel of the vehicle. The image is analyzed for obtaining scene information where various characteristics in the scene may be analyzed for determining whether water is present in the image. FIG. 5 illustrates an image captured by the image capture device that is mounted on the side of the vehicle. The image may be processed so that a downward view is captured (i.e., looking down at the road of travel). A lens utilized by a respective image capture device may utilize a fisheye lens where a wide field-of-view is captured (e.g., 180 degrees). Image processing may also be applied to change the pose of the camera such that pose, as viewed in the image, is directed downward. For example, if an image from one of the respective side cameras is utilized, then a respective location in the image, although not the focal point of the camera pose, may be utilized for generating a virtual pose which renders the scene as if the camera where looking directly downward capturing the wheel 14, the road surface 12, and water 19. To change the pose, a virtual camera model may be used with the captured image such that a virtual pose is utilized to reorient the image so that a virtual image is generated as if the camera is reoriented and facing a different direction (e.g., facing directly downward). Reorienting the image to generate the virtual image includes identifying the virtual pose and mapping of each virtual point on the virtual image to a corresponding point on the real image. The term pose as used herein refers to a camera viewing angle (whether real camera or virtual camera) of a camera location defined by the camera coordinates and the orientation of a camera z-axis. The term virtual camera as used herein is referred to a simulated camera with simulated camera model parameters and simulated imaging surface, in addition to a simulated camera pose. Camera modeling as performed by the processor is described herein as obtaining a virtual image which is a synthesized image of the scene using the virtual camera modeling.

Referring again to FIG. 4, in step 51, a region of interest is identified from the real image or virtual image. This technique localizes the region of interest which identifies a respective region relative to where tire tracks are anticipated if the tires are traveling though water on the road surface. The region of interest for tire tracks left by the wheel extends directly rearward from the tire if the vehicle is traveling in a forward moving direction. As shown in FIG. 5, the exemplary region identified by 49 represents region of interest in the image.

Referring again to FIG. 4, in step 52, polar coordinate conversion is applied to the image. Polar coordinate conversion converts the original region of interest image into a polarized image. Polar coordinate conversion utilizes a polar coordinate system which is a two dimensional coordinate system where each point on a plane is determined by a distance from a reference point and an angle from a respective reference direction. Typically, the reference point is referred to as a pole, which is shown as element 60 in FIG. 5. The reference direction is commonly referred to as a polar axis. The distance from the pole is referred to herein as the radius. Each pixel within the region of interest is mapped to a polarized image utilizing the radius and the angle.

Figure 6:
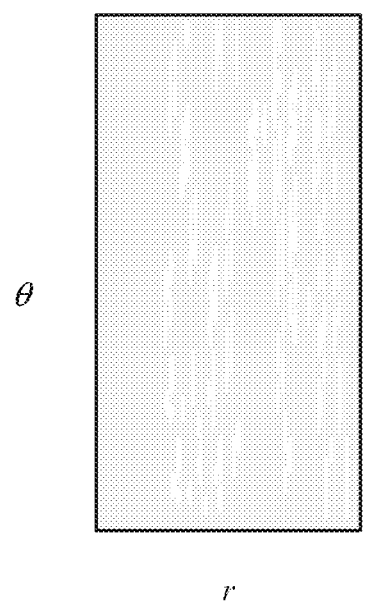
FIG. 6 illustrates an exemplary polarized image.

FIG. 6 illustrates an exemplary polarized image. The y-axis represents the radius (r) to each pixel from the pole. The x-axis represents the angle (θ) in degrees relative to a reference direction. Image polar conversion is used to identify the edge of the tire track resulting from the tire rotating on the water on the surface of the road. Depending on vehicle speed and water depth, an edge of the tire track may not be strictly parallel to a vehicle side line. As a result, a small angle can form between the edge of the tire track and the vehicle side line (originated at tire-road contact point). Since the angle may be difficult to capture in real time, the tire-road contact point may be considered as the pole/reference point. Therefore, a polar coordinate conversion may be performed from the pole/reference point, Edges that slightly deviate in other directions from the side vehicle line will be unified into a vertical direction in the polarized image. As shown in FIG. 6, the vertical streaks represent the edge of the tire track.

Referring again to FIG. 4, in step 53, tire track edge detection analysis is performed to determine whether water is present in the region of interest. Edge detection may be performed utilizing a filter, such as a Gabor filter. Gabor filters are a special class of band-pass filters commonly used for edge detection. The 2D Gabor filter used here is basically a Gaussian kernel function modulated by a sinusoidal plane wave. The filter can be customized by defining its parameters such as orientation, scale, and modulation frequency. As such, the Gabor filter is an orientation-sensitive filter. Herein, the orientation of the Gabor filter is defined in vertical direction. As it slides over the polarized image, the filter gives a strong response at the image locations that have structures in the same direction. Therefore, it helps detect the vertical edge line in the polarized image. The identified edges assist in determining edges in the tire track. The edge detection highlights linear movements of texture within the captured image as produced by the edge of the tire track. The texture is represented by many discontinuous short vertical lines in an image where edges are present. In contrast, if the surface is either dry or a snow covered surface, then the texture of the dry or snow covered surface has no linear movement patterns. It should be understood that other types of filtering may be used in addition to Gabor filtering for identifying edges of the tire track in the image without deviating from the scope of the invention.

Figure 7:
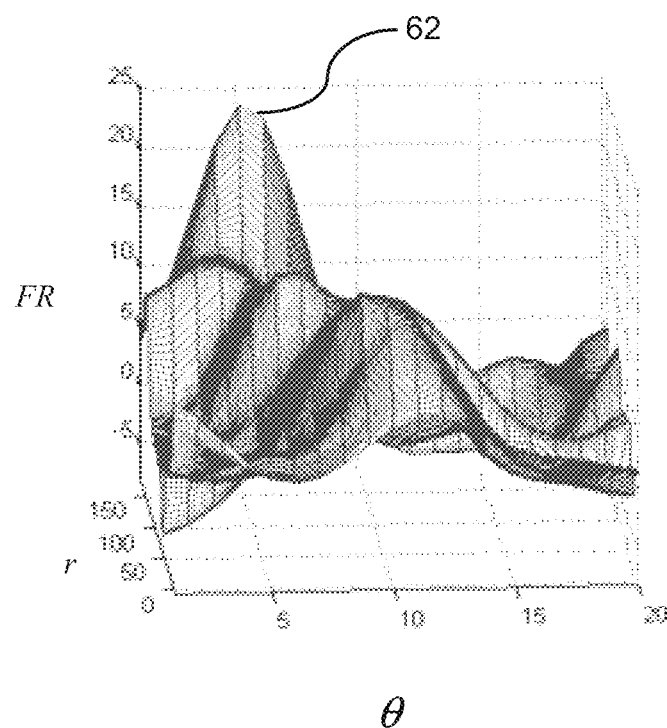
FIG. 7 illustrates an exemplary filter response for a wet road surface.
Figure 8:
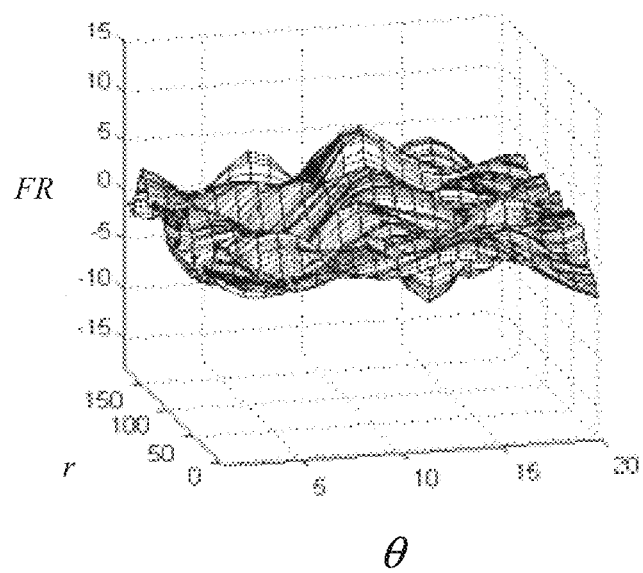
FIG. 8 illustrates an exemplary filter response for a dry road surface.

A filter response of a polarized image on a wet surface is shown in FIG. 7. The filter response is represented as a 3-dimensional plot with the angle (θ) on the x-axis, the radius (r) on the y-axis, and the filter response on the z-axis. As shown, in the filter response, an edge existing between the water track and the splashed water has larger peaks in contrast to a filter response of a dry surface as illustrated in FIG. 8. As shown in the exemplary plot in FIG. 8, a filter response on the dry surface is substantially flat (e.g., around zero with only small peaks. In contrast, the filter response shown in FIG. 7 includes large peaks 62 extending along an edge (e.g., ridge). As shown, multiple peaks are present which represents edges between a tire track where water is maintained close to the track in a respective direction and outside the tire track where water is splashed in various directions in the air. It should be understood that while a Gabor filter is utilized, other types of filters may be utilized that include, but are not limited to Sobel filters or LM filters. It should also be understood that the region where tire tracks are present in the road surface will have a darker shade in the polarized image as compared to areas where water is splashed in the air.

Referring again to FIG. 4, in step 54, feature analysis is applied to analyze the filter response of the polarized image in an effort to extract prominent features that could well distinguish different road surfaces. As illustrated in FIG. 7, if a water track exists, at each respective radius level, a large peak value can be detected around the water track edge line associated with the pertinent radius level. A mean of the peak values from all radius levels should be much larger in comparison to dry surfaces or surfaces with snow. In addition, a standard deviation of the filter response values over all pixels on a watery surface should be larger in comparison to the filter response values over all pixels on the dry surface. It is understood that a classifier is first trained utilizing feature extraction and feature calculation to build a pattern database. Feature extraction includes extracting features from various images to generate a pattern database. At each radius, a scan is performed (e.g., 0-20 degrees) and an average of the peak responses is calculated. Once the pattern database is trained, the pattern database or comparator (e.g., separation threshold) is implemented online with the processor in the vehicle for a calculated feature value from a real-time image. The calculated feature value is compared in feature space relative to separation threshold for determining whether water is present in the captured image. An example of a feature value calculation for an average of the peak filter responses is as follows $$\text{feature } 1 = \frac{1}{N} \sum_{i=1}^{N} \max(I_{\rho i \theta 1}, I_{\rho i \theta 2}, \ldots, I_{\rho i \theta M_r}).$$

An example of a feature value calculation for a variance of filter response values over all pixels of the image is as follows:

$$\text{feature } 2 = \frac{1}{N*M} \sum_{i=1}^{N} \sum_{j=1}^{M} (I_{\rho i \theta j} - \mu_{ROI}).$$

where N is the total number of radius levels, M is the total number of degree levels, $I_{\rho i \theta j}$ is the filter response value of a pixel at radius level i and degree level j, and $\mu_{ROI}$ is a mean of the filter response values over all pixels of the polarized image. It should be understood that the statistical analysis is only one example of feature analysis and that other techniques may be applied without deviating from the scope of the invention.

Figure 9:
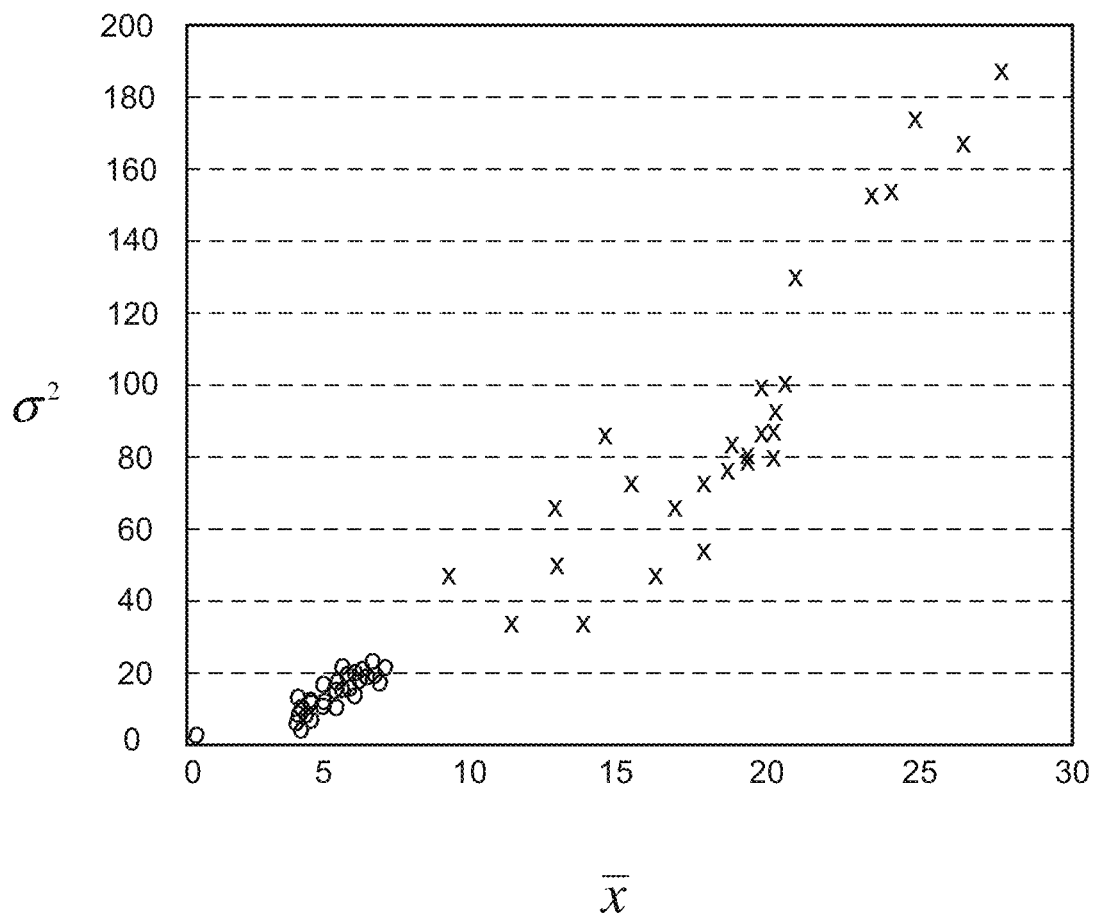
FIG. 9 represents an exemplary feature space characterizing sampled data on wet and dry road surfaces.

FIG. 9 represents an exemplary feature space characterizing sampled data on wet and dry road surfaces. An x-axis represents a first feature, such as a mean of the peak filter responses and the y-axis represents a variance of filter responses over all pixels of the image. The symbols "x" represents a water is present whereas symbol "o" represents an ideal dry surface. Each of the features is plotted in feature space. In a trained classifier, a separation threshold is identified in the feature space to distinguish between water identified by the edges in the tire track and the ideal dry surface.

Referring again to FIG. 4, in step 55, a determination is made whether a water surface feature is detected based on the feature analysis. If the determination is made that the water surface feature is detected, then the routine proceeds to step 56; otherwise, the routine proceeds to step 57.

In step 56, in response to a determination that the water surface feature is detected, a wet surface indicator flagged is set indicating water is present in the region of interest. A signal is communicated to a controller where various vehicle operations as described earlier can be actuated that include, but are not limited to, braking control, traction control, steering control, speed control, driver warning, air baffle control, and vehicle to vehicle communication.

If the determination was made in step 55 that water was not present in the region of interest, then the routine proceeds to step 57 where other additional techniques may be utilized to verify whether water is present or not.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet surface condition of a road surface, the method comprising:
    capturing an image of the road surface by an image capture device of a host vehicle, the image capture device mounted on a side of the host vehicle and capturing the image in a downward direction;
    identifying in the captured image, by a processor, a region of interest in a region rearward of a tire of the host vehicle, the region of interest representative of where a tire track as generated by the tire occurs when the road surface is wet;
    determining whether water is present in the region of interest as a function of identifying the tire track generated by the tire; and
    generating a wet road surface signal in response to the determination of water being present in the region of interest.

2. The method of claim 1 wherein determining whether water is present in the region of interest further comprises converting the image of the region of interest into a polarized image, the polarized image assisting in identifying a vertical line edge of the tire track in the polarized image.

3. The method of claim 2 wherein converting the image into a polarized image comprises:
    identifying a pole in the region of interest;
    identifying a polar axis originating from the pole; and
    generating the polarized image as function of radii and angles, each radius in the polarized image determined as a function of a distance from the pole to each image pixel, and each angle in the polarized image determined as an angle between the polar axis and each image pixel.

4. The method of claim 3 wherein the polarized image assists in identifying the vertical line edge of the tire track which is representative of water present on the road surface, wherein a shade of the tire track in the polarized image is darker in comparison to water splash in adjacent areas of the road.

5. The method of claim 4 further comprising applying a filter to the polarized image to identify the vertical line edge of the tire track in the image.

6. The method of claim 5 wherein applying a filter includes applying an edge detection filter.

7. The method of claim 6 wherein the edge detection filter includes a Gabor filter applied to the polarized image.

8. The method of claim 6 further comprising generating a filter response by the edge detection filter, the filter response generating data indicative of vertical line edge between the tire track and the water splash.

9. The method of claim 8 further comprising applying feature analysis to analyze filter response data in determining whether a feature value for an extracted feature from the filter response data represents a presence of the water.

10. The method of claim 9 further comprising plotting the filter response data as a function of radius data and angle data of the polarized image, wherein an edge is determined when the filter response data indicates peaks relatively larger in comparison to filter response data from a dry road surface.

11. The method of claim 10 further comprising generating an offline classifier utilizing feature extraction and feature calculation.

12. The method of claim 11 further comprising generating a separation threshold based on the offline classifier, wherein the separation threshold is implemented within the processor of the host vehicle, wherein the feature value is determined based on features extracted from a real image captured by the image capture device, and wherein the feature value is compared in the feature space relative to the separation threshold to identify the wet road surface.

13. The method of claim 12 wherein the feature value includes an average value that is determined by the following formula:

$$\text{feature } 1 = \frac{1}{N}\sum_{i=1}^{N} \max(I_{\rho i\theta 1}, I_{\rho i\theta 2}, \ldots, I_{\rho i\theta M},)$$

where N is the total number of radius levels, M is the total number of degree levels, and $I_{\rho i\theta j}$ is the filter response value of a pixel at radius level i and degree level j.

14. The method of claim 13 wherein the feature value includes a variance value that is determined by the following formula:

$$\text{feature } 2 = \frac{1}{N*M}\sum_{i=1}^{N}\sum_{j=1}^{M}(I_{\rho i\theta j} - \mu_{ROI}).$$

where N is the total number of radius levels, M is the total number of degree levels, $I_{\rho i\theta j}$ is the filter response value of a pixel at radius level i and degree level j, and $\mu_{ROI}$ is a mean of the filter response values over all pixels on the polarized image.

15. The method of claim 1 wherein capturing the image in a downward direction includes capturing a real downward image of the road surface.

16. The method of claim 15 wherein capturing the image in a downward direction includes generating a virtual image in a downward direction based on the real image, wherein the virtual image is generated by reorienting the real image so that the virtual image is generated as if a camera pose is facing downward.

17. The method of claim 16 wherein reorienting the real image to generate the virtual image comprises:
mapping each virtual point on the virtual image to a corresponding point on the real image.

18. The method of claim 1 further comprising providing the wet road surface signal to a vehicle controller, and autonomously actuating vehicle braking via the controller in response to the wet road surface signal to thereby mitigate condensation build-up on vehicle brakes.

19. The method of claim 1 further comprising providing the wet road surface signal to a vehicle controller, and autonomously actuating a traction control system via the controller in response to the wet road surface signal to thereby mitigate condensation build-up on vehicle brakes.

20. The method of claim 1 further comprising providing the wet road surface signal to a wireless communication system for alerting other vehicles of the wet road surface condition.

21. The method of claim 1 further comprising alerting, via the wet road surface signal, a driver of a potential reduced traction between vehicle tires and the road surface.

22. The method of claim 1 further comprising alerting, via the wet road surface signal, a driver of the vehicle against a use of cruise control.

23. The method of claim 1 further comprising alerting, via the wet road surface signal, a driver of the vehicle against a use of automated features.

24. The method of claim 1 further comprising providing the wet road surface signal to a vehicle controller, the controller autonomously modifying a control setting of an automated control feature in response to the wet road surface signal.

25. The method of claim 1 further comprising providing the wet road surface signal to a vehicle controller, and autonomously disabling cruise control via the controller in response to the wet road surface signal.

26. The method of claim 1 further comprising alerting, via the wet road surface signal, a driver to reduce a vehicle speed of the host vehicle.

27. The method of claim 1 further comprising providing the wet road surface signal to a vehicle controller, and shutting baffles on an air intake scoop of the host vehicle in response to the wet road surface signal for preventing water ingestion.

* * * * *